United States Patent
Naito et al.

(10) Patent No.: US 7,008,578 B2
(45) Date of Patent: Mar. 7, 2006

(54) METHOD FOR PRODUCTION OF EXTRUDED, POLYSTYRENE-BASED RESIN FOAM PLATE AND EXTRUDED FOAM PLATE OBTAINED THEREBY

(75) Inventors: Masato Naito, Kanuma (JP); Naochika Kogure, Utsunomiya (JP); Daisuke Imanari, Tochigi-ken (JP); Noritoshi Nishiyama, Utsunomiya (JP)

(73) Assignee: JSP Corporation, Tokyo (JP)

( * ) Notice: Subject to any disclaimer, the term of this patent is extended or adjusted under 35 U.S.C. 154(b) by 183 days.

(21) Appl. No.: 10/170,706

(22) Filed: Jun. 14, 2002

(65) Prior Publication Data
US 2003/0124334 A1   Jul. 3, 2003

(30) Foreign Application Priority Data
Jun. 29, 2001   (JP) ............................. 2001-199724

(51) Int. Cl.
*B29C 44/20* (2006.01)
(52) U.S. Cl. ...................... 264/50; 264/53; 264/DIG. 5
(58) Field of Classification Search ................. 264/51, 264/53, DIG. 5, 50
See application file for complete search history.

(56) References Cited

U.S. PATENT DOCUMENTS

| | | | |
|---|---|---|---|
| 5,182,308 A | | 1/1993 | Voelker et al. ................ 521/79 |
| 5,453,454 A * | | 9/1995 | Alicke et al. ................ 521/79 |
| 5,688,832 A * | | 11/1997 | Paquet et al. ................ 521/79 |
| 6,197,233 B1 * | | 3/2001 | Mason et al. ................ 264/45.9 |
| 6,225,364 B1 * | | 5/2001 | Chaudhary et al. ........... 521/82 |
| 6,303,667 B1 * | | 10/2001 | Kruecke ..................... 521/131 |
| 6,310,112 B1 * | | 10/2001 | Vo et al. .................... 521/134 |
| 6,315,932 B1 | | 11/2001 | Fujiwara et al. .............. 264/53 |
| 6,440,241 B1 * | | 8/2002 | Mason et al. ................ 156/78 |
| 6,569,912 B1 | | 5/2003 | Oohara et al. ............... 521/79 |
| 6,696,504 B1 * | | 2/2004 | Hayashi et al. ............... 521/79 |
| 2003/0042644 A1 | | 3/2003 | Gokuraku et al. ............ 264/55 |

FOREIGN PATENT DOCUMENTS

EP         1024163        4/1998

* cited by examiner

*Primary Examiner*—Allan R. Kuhns
(74) *Attorney, Agent, or Firm*—Bacon & Thomas, PLLC (57) ABSTRACT

A method for production of an extruded, polystyrene-based foam plate wherein a polystyrene-based resin is heated and kneaded together with a blowing agent, a flame retardant and a nucleating agent in an extruder to obtain a foamable molten composition, and the foamable molten composition is extruded through a die attached to an end of the extruder into a lower pressure zone. The blowing agent comprises not smaller than 25% by weight but not greater than 65% by weight, based on the total weight of the blowing agent, of an isobutane-containing saturated hydrocarbon; not smaller than 5% by weight but not greater than 70% by weight, based on the total weight of the blowing agent, of a dimethyl ether-containing ether; not smaller than 5% by weight but not greater than 55% by weight, based on the total weight of the blowing agent, of carbon dioxide; and 0–25% by weight, based on the total weight of the blowing agent, of other blowing agent components.

9 Claims, 1 Drawing Sheet

FIG. 1

METHOD FOR PRODUCTION OF EXTRUDED, POLYSTYRENE-BASED RESIN FOAM PLATE AND EXTRUDED FOAM PLATE OBTAINED THEREBY

BACKGROUND OF THE INVENTION

The present invention relates to a method for the production of an extruded, polystyrene-based resin foam plate for use as a heat insulator for walls, floors, roofs and so on of buildings or as a tatami mat core, and to an extruded polystyrene-based resin foam plate obtained by the method.

Because polystyrene-based resin foams have excellent heat insulating property and desirable mechanical strengths, plates thereof formed to have a specific width have been widely used as heat insulators. One known method for production of such a foam plate comprises the steps of heating and kneading a polystyrene-based resin material together with a nucleating agent, mixing the kneaded mixture with a physical blowing agent, and extruding the mixture from a high pressure zone into a lower pressure zone.

As the blowing agent for use in the production of the foam plate, a chlorofluorohydrocarbon (which will be hereinafter referred to as "CFC") such as dichlorodifluoromethane have been hitherto widely used. However, in place of CFCs having a possibility of destroying the ozone layer, a hydrogen atom-containing chlorofluorohydrocarbon (which will be hereinafter referred to as "HCFC"), which has a smaller ozone destroy coefficient, is increasingly used in recent years.

However, HCFCs, whose ozone destroy coefficient is not 0, are not without possibility of destroying the ozone layer. Thus, it has been studied to use a fluorohydrocarbon (which will be hereinafter referred to as "HFC") having an ozone destroy coefficient of 0 and containing no chlorine atom in the molecules thereof as the blowing agent.

However, HFCs have a large global warming coefficient and thus still have a room to be improved in view of the preservation of the global environment.

Thus, it is desired to produce a polystyrene-based resin foam plate using a blowing agent having an ozone destroy coefficient of 0 and a small global warming coefficient.

Isobutane, which has an ozone destroy coefficient of 0 and a small global warming coefficient, is an excellent blowing agent. Also, since isobutane has a permeation rate to polystyrene which is much lower than that of air, a foamed heat insulation plate produced using isobutane can maintain the heat insulating property at the time of production over a long period of time. However, since isobutane in a gas phase has a thermal conductivity which is lower than that of air but higher than that of CFCs, HCFCs or HFCs which have been heretofore used, it is difficult to obtain a heat insulating property comparable to that given by HFCs and so on by using isobutane as a blowing agent. Also, since isobutane has a high flammability itself, it is considerably difficult to impart flame retardancy to the resulting foam.

In recent years, an attempt has been made to use an ether type blowing agent such as dimethyl ether together with pentane. The purpose of using such a mixed blowing agent is to obtain a polystyrene-based resin foam plate which has an ozone destroy coefficient of 0 and a small global warming coefficient and which is excellent in flame retardancy, heat insulating property and light in weight. To achieve this purpose, there is proposed a foam, which is produced using a large amount of a flammable blowing agent such as pentane and which has such a special cell structure for improving the heat insulating property that cells of large and small sizes are mingled. Additionally, the foam contains a specially formulated flame retardant for improving the flame retardancy. However, this method has problems in productivity and stable flame retardancy.

SUMMARY OF THE INVENTION

The present invention has been made in view of the drawbacks of the conventional polystyrene resin extruded foam plate.

It is, therefore, an object of the present invention to provide an extruded, polystyrene-based resin foam plate which is produced using isobutane having an ozone destroy coefficient of 0 and a small global warming coefficient as a blowing agent, and which has excellent flame retardancy, low thermal conductivity and a high heat insulating property.

According to the present invention, there is provided a method for the production of an extruded, polystyrene-based resin foam plate comprising the steps of heating and kneading a polystyrene-based resin together with a blowing agent, a flame retardant and a nucleating agent in an extruder to obtain a foamable molten composition, and extruding said foamable molten composition through a die attached to an end of said extruder into a lower pressure zone, wherein said blowing agent comprises:
(a) not smaller than 25% by weight but not greater than 65% by weight, based on the total weight of said blowing agent, of an isobutane-containing saturated hydrocarbon;
(b) not smaller than 5% by weight but not greater than 70% by weight, based on the total weight of said blowing agent, of a dimethyl ether-containing ether;
(c) not smaller than 5% by weight but not greater than 55% by weight, based on the total weight of said blowing agent, of carbon dioxide; and
(d) 0–25% by weight, based on the total weight of said blowing agent, of other blowing agent components.

The present invention also provides an extruded, polystyrene-based resin foam plate, which is produced by the above method, which contains cells having an average diameter in the thickness direction of the plate of 50–180 μm and which has an apparent density of 25–60 kg/m$^3$.

BRIEF DESCRIPTION OF THE DRAWING

Other objects, features and advantages of the present invention will become apparent from the detailed description of the preferred embodiments of the invention which follows, when considered in the light of the accompanying drawing, in which.

DETAILED DESCRIPTION OF THE PREFERRED EMBODIMENTS OF THE INVENTION

A method for the production of an extruded, polystyrene-based foam plate (which will be hereinafter referred to simply as "extruded foam plate") according to the present invention includes extruding a foamable molten composition containing a polystyrene-based resin, a blowing agent, a flame retardant and a nucleating agent through a die from a high pressure zone to a lower pressure zone. The blowing agent comprises, consists essentially of or consists of the following ingredients (a)–(d):

Ingredient (a): not smaller than 25% by weight but not greater than 65% by weight, based on the total weight of the blowing agent, of saturated hydrocarbons including isobutane, Ingredient (b): not smaller than 5% by weight but not greater than 70% by weight, based on the total weight of the blowing agent, of ethers including dimethyl ether, Ingredient (c): not smaller than 5% by weight but not greater than 55% by weight, based on the total weight of the blowing agent, of carbon dioxide, and Ingredient (d) which is an optional ingredient: 0–25% by weight, based on the total weight of the blowing agent, of other blowing agent components.

More particularly, in the method for production of the extruded foam plate according to the present invention, a polystyrene-based resin and additives such as a flame retardant and a nucleating agent is charged in an extruder and kneaded with heating to obtain a molten resin mixture. The molten resin mixture is then mixed with a blowing agent having the above composition under a high pressure to obtain a foamable molten composition. After the temperature of the foamable molten composition has been adjusted to a temperature suitable for foaming, the foamable molten composition is extruded from a high pressure zone to a lower pressure zone through a die attached to an end of the extruder. The extruded foam plate produced by the method has a large thickness and a low apparent density, is excellent in flame retardancy and heat insulating property, and can contribute to preservation of global environment.

Suitable examples of the polystyrene-based resin for use in the present invention include styrene homopolymers, and copolymers mainly composed of styrene such as a styrene-acrylic acid copolymer, a styrene-methacrylic acid copolymer, a styrene-maleic anhydride copolymer, a styrene-butadiene copolymer, a styrene-acrylonitrile copolymer, an acrylonitrile-butadiene-styrene terpolymer and a high-impact polystyrene. These homopolymers and copolymers may be used alone or in combination of two or more thereof. The styrene-based copolymers preferably comprise styrene monomeric units of at least 50 mol %, and more preferably at least 80 mol %.

The polystyrene-based resin for use in the present invention preferably has a melt flow rate (MFR) in the range of 0.5–30 g/10 min (as measured according to JIS K7210-1976, Test Condition 8 of Method A). More preferable is the use of a polystyrene-based resin having a melt flow rate in the range of 1–10 g/10 min because excellent extrusion moldability can be obtained in producing the extruded foam plate and because the resulting extruded foam plate can have high mechanical strengths.

If desired, the polystyrene-based resin may be used as a mixture with another polymer or copolymer such as a polyolefin resin or a styrene-based elastomer as long as the object and effect of the present invention is not adversely affected. The amount of such another polymer or copolymer is not more than 30 parts by weight per 100 parts by weight of the polystyrene-based resin.

In the present invention, the use of a non-linear polystyrene-based resin containing monomer units each having 1–4 branch points is preferred. Such a non-linear polystyrene-based resin has good kneadability with a mixed blowing agent containing carbon dioxide, and the use of which can lower the pressure within the die at the time of extrusion and makes it possible to produce an extruded foam plate which is excellent in appearance and mechanical strengths and which has a low apparent density.

The method for production of an extruded foam plate according to the present invention is characterized by the use of a specific blowing agent, which is comprised of a saturated hydrocarbon including isobutane (Ingredient (a)), an ether including dimethyl ether (Ingredient (b)), and carbon dioxide (Ingredient (c)), and is free of chlorofluorocarbons or fluorocarbons. Thus, the blowing agent contained in the extruded foam plate of the present invention has an ozone destroy coefficient of 0 and a small global warming coefficient.

The saturated hydrocarbon used as Ingredient (a) of the blowing agent in the present invention should include isobutane as an essential component. The saturated hydrocarbon blowing agent may be composed of isobutane alone or two or more saturated hydrocarbons including isobutane. Suitable examples of saturated hydrocarbons other than isobutane include ethane, propane, n-butane, isopentane, cyclopentane and n-pentane. The amount of the saturated hydrocarbons other than isobutane is preferably not greater than 10% by weight, more preferably not greater than 5% by weight, and especially preferably not greater than 3% by weight, based on the total weight of the saturated hydrocarbon blowing agent. From the viewpoint of the ability of maintaining heat insulating property of the resulting extruded foam plate, the saturated hydrocarbon blowing agent is preferably composed of isobutane alone.

The ether used Ingredient (b) of the blowing agent includes dimethyl ether as an essential component. The ether blowing agent in the blowing agent may be composed of dimethyl ether alone or two or more ethers including dimethyl ether. Suitable examples of ethers other than dimethyl ether include diethyl ether, methyl ethyl ether, and methyl vinyl ether. The ethers other than dimethyl ether are preferably used in an amount of not greater than 80% by weight, more preferably not greater than 50% by weight, and especially preferably not greater than 30% by weight, based on the total weight of the ether blowing agent. From the viewpoint of solubility to the polystyrene-based resin and easiness in handling, the ether blowing agent in the mixed blowing agent is preferably composed of dimethyl ether alone.

In addition to the saturated hydrocarbons, ethers and carbon dioxide, other blowing agent components (Ingredient (d)) may be optionally incorporated into the blowing agent, if desired. Suitable examples of the other blowing agent components include an alkyl chloride such as methyl chloride and ethyl chloride; an alcohol such as methanol and ethanol; water; an inorganic gas such as nitrogen; and ketone. The following effects may be obtained by the use of the other blowing agent components. When an alkyl chloride is substituted for a part of the ether blowing agent, for example, a risk of an ignition incident in producing the extruded foam plate can be reduced. When an alkyl chloride is as a substitute for a part of the saturated hydrocarbon blowing agent, the flame retardancy of the resulting extruded foam plate can be improved. However, for the purpose of the present invention, the amount of the other blowing agent component (Ingredient (d)) may be 0% by weight.

In the blowing agent, the above ingredients are used in specific amounts. Namely, the amount of the isobutane-containing saturated hydrocarbon (Ingredient (a)) should not be smaller than 25% by weight but should not be greater than 65% by weight, based on the total weight of the blowing agent. When the content of Ingredient (a) is less than 25% by weight, the resulting extruded foam plate has a poor heat insulating property. When the content of Ingredient (a) is over 65% by weight, it is difficult to obtain a sufficient inflammability stably. Thus, there arises a need to employ a special cell structure in which cells of large and small diameters are mingled and a special flame retardant.

The amount of dimethyl ether-containing ether (Ingredient (b)) should not be smaller than 5% by weight but should not be greater than 70% by weight, based on the total weight of the blowing agent. When the content of Ingredient (b) is less than 5% by weight, it is difficult to obtain an extruded foam plate having a low apparent density, resulting in poor lightness and a poor heat insulating property. When the content of Ingredient (b) is over 70% by weight, the resulting extruded foam plate has a poor heat insulating property, and a risk of an ignition incident in production thereof may be increased.

The amount of carbon dioxide (Ingredient (c)) should not be smaller than 5% by weight but should not greater than 55% by weight, based on the total weight of the blowing agent. When the content of Ingredient (c) is less than 5% by weight, it is difficult to form cells having a small average diameter in the resulting extruded foam plate and an effect of improving the flame retardancy and heat insulating property of the extruded foam plate cannot be expected. When the content of Ingredient (c) is over 55% by weight, it is difficult to obtain an extruded foam plate having a low apparent density.

The amount of other blowing agent components (Ingredient (d)) should be in the range of 0–25%, preferably 0–10% by weight, and more preferably 0–5% by weight, based on the total weight of the blowing agent.

Required, preferred and more preferred amounts $W_A$, $W_B$, $W_C$ and $W_D$ (based on the total weight of the blowing agent) of Ingredients (a) through (d), respectively, are

TABLE

| Ingredient | Required Amount (% by weight) | Preferred Amount (% by weight) | More preferred Amount (% by weight) |
| --- | --- | --- | --- |
| (a) | $25 \leq W_A \leq 65$ | $40 < W_A \leq 60$ | $55 \leq W_A \leq 60$ |
| (b) | $5 \leq W_B \leq 70$ | $5 \leq W_B < 40$ | $15 \leq W_B < 35$ |
| (c) | $5 \leq W_C \leq 55$ | $10 < W_C < 55$ | $10 < W_C < 30$ |
| (d) | $0 \leq W_D \leq 25$ | $0 \leq W_D \leq 25$ | $0 \leq W_D \leq 10$ |

It is preferred that the extruded foam plate of the present invention contain residual isobutane in an amount of 0.45–0.80 mol, more preferably 0.45–0.56 mol, per 1 kg of the extruded foam plate. When the residual amount of isobutane is in the above range, a heat insulator having a considerably high heat insulating property can be obtained. More specifically, there can be obtained an extruded foam plate having a thermal conductivity comparable to Type 3 extruded polystyrene foam insulating plate specified in JIS A9511-1995 (not greater than 0.028 W/m·K). When the residual amount of isobutane is over 0.80 mol, there is a possibility of failing to obtain flame retardancy required to a material for construction use. In the case of an extruded foam plate for an application which does not require a considerably high heat insulating property, however, the residual amount of isobutane in the extruded foam plate is preferably less than 0.45 mol per 1 kg thereof from the viewpoint of flame retardancy.

The residual amount of the blowing agents herein is measured by gas chromatography as follows. A sample piece cut off from a center part of an extruded foam plate is put in a sample bottle with a lid, in which toluene is contained. After closing the lid, the bottle is sufficiently shaken so that the blowing agents in the sample piece may be dissolved in the toluene, thereby obtaining a measuring sample liquid. By performing gas chromatography on the sample liquid, the residual amounts of isobutane, etc. in the extruded foam plate are determined.

The measuring conditions of the gas chromatography are as follows.
Column:
    Manufacturer: Shinwa Chemical industries, Ltd.
    Support: Chromosorb W, 60–80 mesh, AW-DMCS treated
    Liquid phase: Silicone DC 550
        (liquid phase quantity: 20%)
    Column size: 4.1 m in length, 3.2 mm in inside diameter
    Column material: glass
    Packed column baking conditions: 220° C., 40 hours
Column temperature: 40° C.
Inlet temperature: 200° C.
Carrier gas: nitrogen
Carrier gas velocity: 3.5 ml/min
Detector: FID
Detector temperature: 200° C.
Determination: internal standard method In the method of the present invention, the following compounds can be used as the flame retardant and the nucleating agent to be kneaded with the polystyrene-based resin in an extruder.

Typical examples of the flame retardant include bromine-containing flame retardants such as hexabromocyclododecane, dibromoneopentylglycol, decabromodiphenyloxide, tetrabromobisphenol A, tetrabromophthalate diol, tetrabromophenol, and polypentabromobenzyl acrylate; chlorine-containing flame retardants such as chlorinated paraffin, chlorendic anhydride, chlorendic acid, and Dechloran Plus (trade name of an organic halogen flame-retardant produced by Occidental Chemical Co.); phosphorus-containing flame retardants such as phosphate esters (e.g. triallyl phosphate, alkylallyl phosphate and alkyl phosphate), halogenated phosphate esters (e.g. phosphonate, pholinen, brominated phosphate ester and chlorinated phosphate ester), guanyl urea phosphate, polyphosphazen, ammonium phosphate, ammonium polyphosphate, and red phosphorus; boron-containing flame retardants such as metal borate (e.g. barium metabarate and zinc borate); nitrogen-containing flame retardants such as melamine phosphate, guanidine phosphate, melem, melamine, and melamine cyanurate; and other flame retardants including tetrazoles, tin oxide, tin hydroxide, antimony oxide, molybdenum oxide, ammonium molybdate, zirconium oxide, zirconium hydroxide, aluminum hydroxide, dawsonite, magnesium hydroxide, and calcium aluminate.

Above all, the use of one or more compounds selected from bromine-containing flame retardants and phosphorus-containing flame retardants is preferred. Bromine-containing flame retardants, especially hexabromocyclododecane, have an excellent flame retardant effect for a polystyrene-based resin extruded foam. Phosphorus-containing flame retardants exhibit a flame retardant effect by a different mechanism from that of bromine-containing flame retardants when a flammable blowing agent remains in an extruded foam plate. Thus, it is preferable to use a bromine-containing flame retardant and a phosphorus-containing flame retardant conjointly to obtain an extruded foam plate having excellent flame retardancy.

More preferably, the extruded foam plate of the present invention contains at least hexabromocyclododecane as a flame retardant in an amount of at least 2 parts by weight per 100 parts of the polystyrene-based resin. The upper limit of the hexabromocyclododecane content is about 10 parts by weight per 100 parts of the polystyrene-based resin from the viewpoint of not hindering formation of cells. The present invention can be accomplished with the use of such a flame retardant. When such a flame retardant is used, it is possible to impart high flame retardancy to the extruded foam plate without using a special flame retardant (for example, ammonium phosphate or ammonium polyphosphate).

The amount of the flame retardant used in the method of the present invention varies depending upon the type thereof, the type and composition of the blowing agent and the apparent density of the extruded foam plate to be produced and, thus, cannot be specifically determined. Generally, however, the flame retardant is used in an amount of 2–20 parts by weight, preferably 2–10 parts by weight, per 100 parts of the polystyrene-based resin.

As a nucleating agent, which is an additive for controlling the average diameter of cells in the extruded foam plate, inorganic particles such as particles of talc, kaolin, mica, silica, calcium carbonate, barium sulfate, titanium oxide, clay, aluminum oxide, bentonite, or diatom earth may be used. The nucleating agents may be used alone or in combination. Among the above examples, talc particles are preferably employed for reasons of easiness to control the cell diameter and freedom of inhibiting the flame retardancy. Especially preferable is the use of talc particles having an average diameter of 0.1–10 $\mu$m, more preferably 0.5–5 $\mu$m.

Talc particles are preferably used in an amount of 1–10% by weight, more preferably 1.5–8% by weight, and most preferably 2–7% by weight, per 100 parts by weight of the extruded foam plate. When the amount of the talc particles is in the above range, an effect of improving flame retardancy can be obtained in addition to the effect of making the cell diameter small.

In the method of the present invention, additives such as colorant, a thermal stabilizer and a filler may be used in addition to the nucleating agent and the flame retardant, as desired, to the extent that it will not inhibit the purpose of the present invention.

It is important that the extruded foam plate of the present invention should have cells having an average diameter, in the thickness direction of the plate, of 50–180 $\mu$m and should have an apparent density of 25–60 kg/m An extruded foam plate having an apparent density of less than 25 kg/m$^3$, which is itself difficult to produce, is poor in mechanical physical properties as compared with a conventional foam insulation plate and thus has limited application. Also, an extruded foam plate having an apparent density of less than the above range is poor in flame retardancy unless containing a sufficient amount of flame retardant. An extruded foam plate having an apparent density of over 60 kg/m$^3$ cannot exhibit a sufficient heat insulating property unless it has a thickness greater than necessary and may have a disadvantage in lightness in weight. The extruded foam plate of the present invention preferably has an apparent density in the range of 32–60 kg/m$^3$. When the apparent density of the extruded foam plate is in this range, it is easy to impart a high heat insulating property thereto.

It is preferred that the extruded foam plate of the present invention meet the flammability standard on extruded polystyrene foam insulation plate provided in JIS A9511-1995. Namely, it is preferred that, when a flammability test is conducted on the extruded foam plate according to Measuring method A in Section 4.13.1 of JIS A9511-1995, the fire goes out on its own in 3 seconds without leaving residue and does not burn beyond a burning limit line. Such an extruded foam plate, which has a low possibility of burning up even if it catches fire, meets with the safety requirements for an extruded polystyrene foam insulating material for construction use.

The extruded foam plate of the present invention preferably has a thermal conductivity of not greater than 0.028 W/m·K, which meets the thermal conductivity standard on Type 3 extruded polystyrene foam insulation plate provided in JIS A9511-1995, and thus is suitable for heat insulation plate for construction use. The thermal conductivity is measured according to a plate type heat flow meter method (a twin-plate type, average temperature: 20° C.) provided in JIS A1412-1994. The extruded foam plate of the present invention preferably has a thickness of 10 to 200 mm, more preferably 20 to 150 mm.

The extruded foam plate of the present invention is required to have cells having an average diameter (a) in the thickness direction of the plate of 50–180 $\mu$m. When the average cell diameter is less than 50 $\mu$m, there is a possibility that, in producing the extruded foam plate, the molten resin mixture which has been extruded through a die lip and has foamed cannot be formed into a plate shape by a shaping device. When the average diameter is over 180 $\mu$m, on the other hand, there is a possibility of failing to obtain a desired heat insulating property. The extruded foam plate preferably has cells having an average diameter (a) in the thickness direction of the plate of 60–150 $\mu$m, more preferably 60–130 $\mu$m.

Preferably, the extruded foam plate of the present invention has a closed cell content of at least 90% and has cells having not only an average diameter in the thickness direction of the plate (a) of 50–180 $\mu$m but also a shape satisfying the following conditions (1) and (2):

$$0.7 \leq a/b \leq 1.3 \quad (1)$$

$$0.7 \leq a/c \leq 1.3 \quad (2)$$

wherein "a" is an average cell diameter in the thickness direction of the extruded foam plate, "b" is an average cell diameter in the lateral direction of the extruded foam plate, and "c" is an average cell diameter in the longitudinal direction of the extruded foam plate.

In the present invention, when a/b is 0.7–1.3 and a/c is 0.7–1.3, the extruded foam plate can have a sufficient heat insulating property.

More preferably, a/b and/or a/c are in the following ranges (3) and (4), respectively.

$$0.8 \leq a/b \leq 1.2 \quad (3)$$

$$0.8 \leq a/c \leq 1.2 \quad (4)$$

When a/b and/or a/c are less than 0.7, the cell are so flat that the compressive strength of the extruded foam plate in the thickness direction may be poor. Also, flat cells have so strong a tendency to get back to spherical shape that the dimensional stability of the foam plate may be poor. When a/b and/or a/c are over 1.3, the number of cell walls in the thickness direction of the form plate is so small that there is a possibility of failing to obtain a high heat insulating property.

A method of measuring the average cell diameter herein will be described below. The average cell diameters (a) and (b) are measured as follows. Using a microscope or the like, an enlarged image of a vertical cross-section of the extruded foam plate taken in the lateral direction thereof (a vertical cross-section in a direction perpendicular to the extrusion direction (longitudinal direction) of the extruded foam plate) is projected on a screen or monitor. On the projected image, a straight line is drawn in the measuring direction and the number of cells through which the line passes is counted. Then, the average cell diameter is obtained by dividing the length of the line (which is not the length on the enlarged projected image but the real length calculated taking the magnification into account) by the number of the counted cells. The average cell diameter (c) is obtained in the same manner using a vertical cross-section of the extruded foam plate taken in the longitudinal direction thereof (in a direction perpendicular to the lateral direction of the extruded foam plate) and so extending as to divide the extruded foam plate into equal halves.

More specifically, the average cell diameter (a) in the thickness direction of the foam plate is obtained as follows. In a vertical cross-section of the foam plate taken in the lateral direction thereof, three lines extending in the thickness direction throughout the entire thickness thereof are drawn at a center part and at two opposite end parts thereof. An average diameter of the cells on each line is obtained from the length of the line and the number of the cells through which the line passes (the length of the line/the number of the cell through which the line passes), and the arithmetic mean of the thus obtained three average diameters is employed as the average cell diameter (a) in the thickness direction of the plate.

The average cell diameter (b) in the lateral direction of the extruded foam plate is obtained as follows. In the vertical cross section of the extruded foam plate taken in the lateral direction thereof, three lines each having a length of 3000 $\mu$m and each so extending in the lateral direction as to divide the cross-section into equal halves are drawn at a center part and two opposite end parts thereof. From the length L of the line (L=3000 $\mu$m) and a number (N−1) in which N is the number of the cells through which the line passes, an average diameter of the cells on the line is given as 3000/(N−1). The arithmetic mean of the thus obtained three average diameters is employed as the average cell diameter (b) in the lateral direction of the plate.

The average cell diameter (c) in the longitudinal direction of the extruded foam plate is obtained as follows. In a vertical cross-section of the extruded foam plate taken in the longitudinal direction thereof, three lines each having a length of 3000 $\mu$m and each so extending in the longitudinal direction as to divide the cross-section into equal halves are drawn at a center part and two opposite end parts thereof. From the length L of the line (L=3000 $\mu$m) and a number (N−1) in which N is the number of the cells through which the line passes, an average diameter of the cells on the line is given as 3000/(N−1). The arithmetic mean of the thus obtained three average diameters is employed as the average cell diameter (c) in the longitudinal direction of the plate.

The extruded foam plate of the present invention preferably has cells of substantially the same size as a whole. It is possible to allow cells of large and small sizes to mingle in the extruded foam plate, as disclosed in Japanese Examined Patent Publication No. H05-49701. However, an extruded foam plate having cells of substantially the same size as a whole is preferable because it is better in uniformity of mechanical properties.

Description will be next made of the method for production of the extruded foam plate of the present invention.

The polystyrene-based resin, the nucleating agent and the flame retardant (and other additives, if desired) are heated and kneaded in an extruder. With the addition of the blowing agent, the kneaded mixture is further heated and kneaded to obtain a foamable molten composition.

On cooling to a temperature suitable for foaming, the foamable molten composition is continuously extruded from a high pressure zone to a lower pressure zone through a die lip and shaped into a plate form while it is foaming. More specifically, the foamable molten composition extruded through the die lip is passed through a shaping device while it is foaming to shape it into a plate form. The extruded foam plate of the present invention, which has cells of a smaller diameter in the thickness direction of the plate as compared with conventional foam plates, can be obtained by using a specific amount of carbon dioxide as one of the components of the blowing agent and adding a nucleating agent to the base resin. The extruded foam plate having cells having average diameters a, b and c satisfying the relations (1) and (2) can be obtained with ease by passing the foamable molten composition through a below-mentioned passage of a shaping device having a specific structure while it is foaming.

The temperature suitable for foaming is in the range in which the foamable molten composition exhibits a viscosity suitable for foaming. The suitable temperature varies depending upon the type of the polystyrene-based resin used, presence or absence of a fluidity improver (when used, the type and amount thereof), and the amount and composition of the blowing agent. In a case where polystyrene homopolymer is used as the polystyrene-based resin, for example, the suitable foaming temperature is generally 110–130° C.

Figure 1:
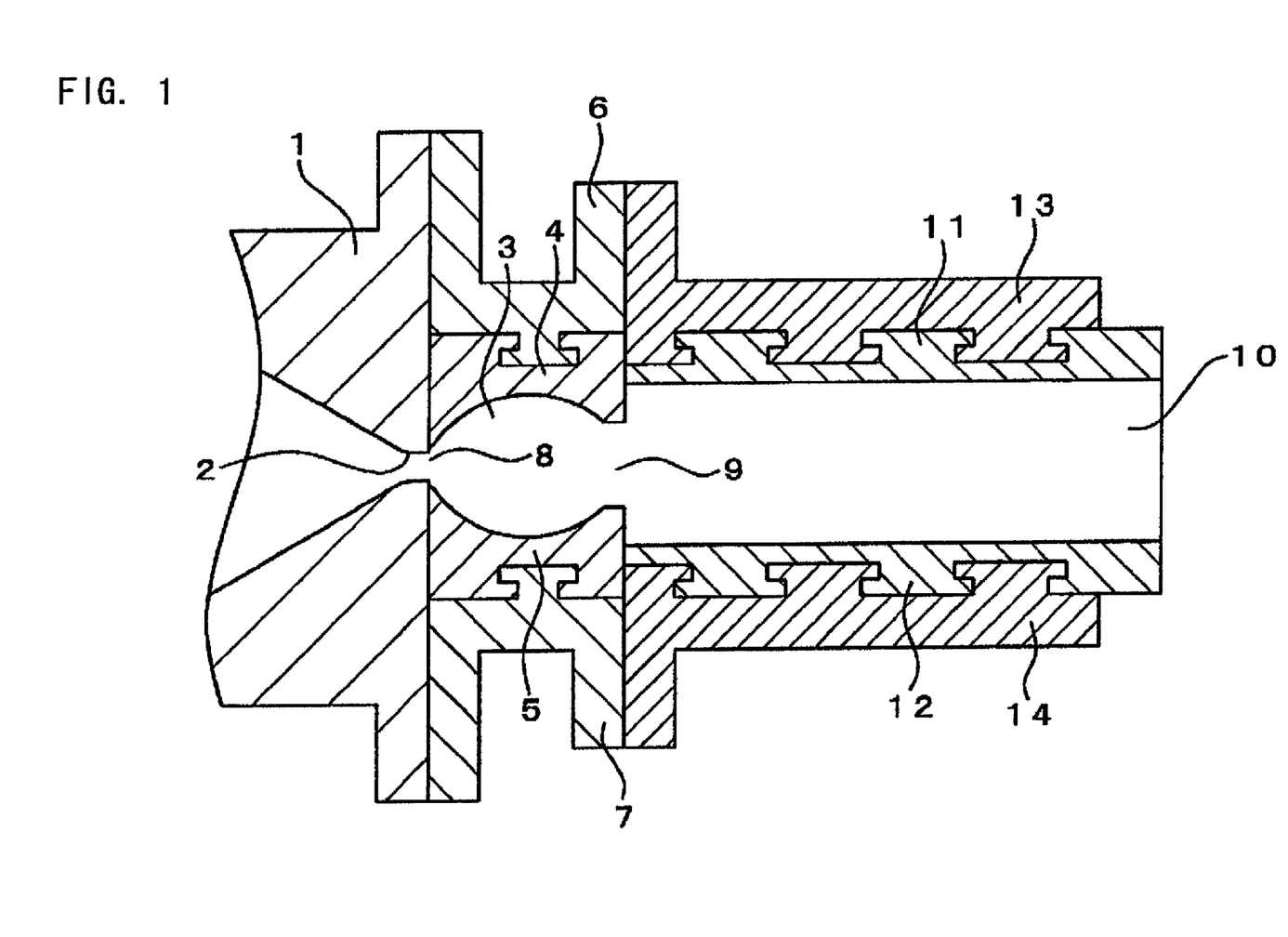
FIG. 1 is a cross-sectional view schematically illustrating an embodiment of a die and a shaping device of a plate forming apparatus useful for carrying out a method for the production of an extruded foam plate according to the present invention.

FIG. 1 is a partial view of an embodiment of a plate forming apparatus having a die, a passage having a specific structure mentioned before and a shaping device. The apparatus may be preferably used in the present invention to obtain an extruded foam plate in which the average cell diameters "a", "b" and "c" satisfy the above conditions (1) and (2). Designated as 1 is a die, as 2 is a die lip, as 3 is the passage having a specific structure, as 4 is an upper wall, as 5 is a lower wall, as 6 is a support plate of the upper wall 4, as 7 is a support plate of the lower wall 5, as 8 is an entrance of the passage, as 9 is an exit of the passage, as 10 is a shaping device, as 11 is an upper parallel plate, as 12 is a lower parallel plate, as 13 is a support plate of the upper parallel plate 11 and as 14 is the support plate of the lower parallel plate 12.

The passage 3 having a specific structure is defined by upper, lower, right and left walls and is in tight contact with the die 1. The passage 3 has such a structure that the distance between the upper and lower walls 4 and 5 is once enlarged and then narrowed from the entrance toward the exit (which will be hereinafter referred to as "type C"). Alternatively, the passage 3 may be of a type in which the upper and lower walls 4 and 5 in the vicinity of the die lip 2 are curved to have a semicircular vertical cross-section and then extend in parallel with each other from the enlarged portion toward the exit.

With a passage of a conventional type in which the distance between the upper and lower walls is enlarged linearly from near the die lip toward the exit (which will be hereinafter referred to as "normal type"), it may be difficult to produce an extruded foam plate having a cell structure in which the average cell diameters "a", "b" and "c" satisfy the relations (1) and (2).

The interior walls, such as the upper wall 4 and the lower wall 5, of the passage 3 are preferably made of a material on which the foamable molten composition can flow smoothly, for example, a fluorine-containing resin such as a polytetrafluoroethylene resin.

In the method of the present invention, after having been passed through the passage 3, the foamable molten composition, which is still in the process of foaming, is then passed through the shaping device 10 and formed into an extruded foam plate having a plate shape. Namely, the foamable molten composition withdrawn from the exit 9 of the passage 3 is allowed to foam further in the shaping device 10 having the two parallel plates 11 and 12 and to fill the gap therebetween, whereby the foamable molten composition is formed into the extruded foam plate having a plate shape.

In forming the extruded foam plate in the shaping device, the withdrawal rate of the foamable molten composition is suitably adjusted to allow the foamable molten composition still in the process of foaming to expand at least in the thickness and lateral directions thereof while it is passing through the shaping device and to fill the gap between the upper and the lower parallel plates 11 and 12. Thereby, the foamable molten composition may be formed into the extruded foam plate having a plate shape with its expansion at least in the thickness direction restrained. Meant by "to allow the foamable molten composition to expand at least in the thickness and lateral directions" is that the foamable molten composition may be allowed to additionally expand in the extrusion direction thereof depending upon the balance between the extrusion rate and the withdrawal rate thereof. Meant by the languages "with its expansion at least in the thickness direction restrained" is that when the foamable molten composition in the process of foaming expands to reach the side parallel walls of the passage 3, it may be allowed to be restrained from expansion in the lateral direction thereof by the side walls.

The shaping device 10 of the plate forming apparatus comprises at least upper and lower parallel plates 11 and 12. Meant by "comprises at least upper and lower parallel plates" is that the shaping device may be further provided with parallel plates on both sides thereof. When the shaping device 10 of the plate forming apparatus has only upper and lower parallel plates 11 and 12, both sides thereof are opened to the air. The material of the parallel plates is not specifically limited. However, for the purpose of decreasing friction resistance with the foamable molten composition to smooth the surfaces of the resulting extruded foam plate, the use of plates of a fluorine-containing resin such as polytetrafluoroethylene is preferred.

According to the method described above, it is possible to produce the extruded foam plate of the present invention with ease. The thus produced extruded foam plate preferably has a closed cell content of at least 90%, more preferably at least 93%. The higher the closed cell content is, the better the extruded foam plate can maintain the heat insulating property.

The closed cell content of the extruded foam plate is obtained according to Procedure C of ASTM D-2856-70 as follows. The true volume Vx of a cut sample of the extruded foam plate is measured using Air Comparison Pycnometer Type-930 manufactured by Toshiba Beckmann Inc. At this time, a cut sample cut into the size of 25 mm×25 mm×20 mm and having no molded skin is placed in a sample cup for measurement. When the extruded foam plate is so thin that a cut sample having a thickness of 20 mm cannot be cut off therefrom, the measurement may be conducted using, for example, two cut samples having a size of 25 mm×25 mm×10 mm together. The closed cell content S (%) is calculated by the formula (7):

$$S(\%) = (Vx - W/\rho) \times 100 / (Va - W/\rho) \quad (7)$$

wherein
Vx: True volume ($cm^3$) of the cut sample(s) measured by the above method, which corresponds to a sum of a volume of the resin constituting the cut sample(s) and a total volume of all the closed cells in the cut sample(s);
Va: Apparent volume ($cm^3$) of the cut sample(s) used for the measurement, which is calculated from the outer dimension thereof;
W: Weight (g) of the cut sample(s) used for the measurement; and
$\rho$: Density ($g/cm^3$) of the resin constituting the extruded foam plate.

Similar measurement is carried out on three different samples and an average is calculated.

The following examples will further illustrate the present invention.

EXAMPLE 1, 2, 5, and 6, COMPARATIVE EXAMPLE 2, 3 and 4

The ingredients used were 100 parts by weight of polystyrene (G330c made by Toyo Styrene Co.), 8.3 parts by weight of talc master batch (a master batch composed of 69% by weight of the same polystyrene as above, 30% by weight of talc (High Filler #12, made by Matsumura Sangyo Co., Ltd., average diameter: 2.5 μm) and 1% by weight of zinc stearate) as a nucleating agent, a mixture of 3 parts by weight of hexabromocyclododecane and a small amount of stabilizer as a flame retardant, and a blowing agent prepared by mixing isobutane, dimethyl ether and carbon dioxide in proportions shown in Table 1-1, Table 1-2 and Table 2 in amounts shown in Table 1-1, Table 1-2 and Table 2.

As the extruder, an extruder having a diameter of 65 mm (which will be hereinafter referred to as "first extruder"), an extruder having a diameter of 95 mm (which will be hereinafter referred to as "second extruder") and an extruder having a diameter of 150 mm (which will be hereinafter referred to as "third extruder") connected in series were used. The blowing agent was injected into the molten resin at a position near the downstream end of the first extruder.

A die lip having a resin discharge port having a width of 115 mm and a lip gap of 1.5 mm (rectangular cross-section) at an end thereof was used. At the end of the die lip was attached a type-C passage which was defined by upper, lower, right and left walls made of polytetrafuluoroethylene and in which the distance between the upper and lower walls was once enlarged and then narrowed from the entrance toward the exit, as shown in FIG. 1.

A shaping device 10 was constructed by upper and lower plates made of polytetrafluoroethyrene and attached to the type-C passage as shown in FIG. 1.

The ingredients including the polystyrene-based resin were kneaded in the first extruder at 220° C. The blowing agent was injected into the kneaded mixture at a position near the downstream end of the first kneader to obtain a foamable molten composition which was subsequently passed successively through the second and third extruders. During the passage through the second and third extruders, the foamable molten composition was gradually cooled so that the temperature of the foamable molten composition in a connector between the third extruder and the die was as shown in Table 1-1, Table 1-2 or Table 2 (indicated as "foaming temperature"). The foamable molten composition was then extruded through the die lip at an extrusion rate shown in Table 1-1, Table 1-2 or Table 2 while maintaining the temperatures of the die and the die lip at 120° C. and 110° C., respectively. In this case, the pressure of the foamable molten composition in the die was 40 kgf/cm The foamable molten composition extruded from the die lip was compressed and allowed to foam during its passage through the passage and then allowed to fill in the shaping section to shape it into a plate shape, thereby obtaining an extruded foam plate. The withdrawal rate at that time is shown in Table 1-1, Table 1-2 and Table 2.

The apparent density, thickness, closed cell content, average cell diameter in the thickness direction of the plate, cell deformation rate, thermal conductivity, flammability, and residual amount of blowing agent of the thus obtained extruded foam plate are summarized in Table 3-1, Table 3-2 and Table 4. The extruded foam plates obtained in the above examples and comparative examples had a thickness of 26 mm and a width of 240 mm.

EXAMPLE 3

An extruded foam plate was produced in the same manner as that in Example 1 except that the amount of the talc master batch was changed to 16.7 parts by weight. The apparent density, thickness, closed cell content, average cell diameter in the thickness direction of the plate, cell deformation rate, thermal conductivity, flammability, and residual amount of blowing agents of the thus obtained extruded foam plate are summarized in Table 3-1.

EXAMPLE 4, COMPARATIVE EXAMPLE 1

An extruded foam plate was produced in the same manner as in Example 1 except that the C-type passage in which the distance between the upper and lower walls was once enlarged and then narrowed from the entrance toward the exit was changed to a normal type passage in which the distance between the upper and lower walls was enlarged gradually and linearly from the entrance toward the exit. The apparent density, thickness, closed cell content, average cell diameter in the thickness direction of the plate, cell deformation rate, thermal conductivity, flammability, and residual amount of blowing agents of the thus obtained extruded foam plate are summarized in Table 3-2 and Table 4.

TABLE 1-1

Production Conditions

|  |  | Ex. 1 | Ex. 2 | Ex. 3 |
|---|---|---|---|---|
| Amount of blowing agent (% by weight) *1 | Isobutane | 3.31 | 3.13 | 2.94 |
|  | Dimethyl ether | 1.34 | 1.49 | 1.64 |
|  | Carbon dioxide | 0.95 | 0.95 | 0.95 |
|  | Total | 5.60 | 5.57 | 5.53 |
| Mixing proportion of blowing agents (% by weight) *2 | Isobutane | 59.1 | 56.2 | 53.2 |
|  | Dimethyl ether | 23.9 | 26.8 | 29.7 |
|  | Carbon dioxide | 17.0 | 17.0 | 17.5 |
| Talc (% by weight) *1 |  | 2.2 | 2.2 | 4.2 |
| Passage shape of shaping device |  | Type C | Type C | Type C |
| Distance between upper and lower plates (mm) |  | 26 | 26 | 26 |
| Foaming temperature (° C.) |  | 125 | 125 | 125 |
| Extrusion rate (kg/hr) |  | 50 | 50 | 50 |
| Withdrawal rate (m/min) |  | 3.4 | 3.4 | 3.4 |

*1: % By weight based on the total amount of extruded foam plate.
*2: % By weight based don the total amount of blowing agents.

TABLE 1-2

Production Conditions

|  |  | Ex. 4 | Ex. 5 | Ex. 6 |
|---|---|---|---|---|
| Amount of blowing agents (% by weight) | Isobutane | 3.13 | 2.51 | 2.85 |
|  | Dimethyl ether | 1.49 | 1.99 | 2.26 |
|  | Carbon dioxide | 0.95 | 0.95 | 1.08 |
|  | Total *1 | 5.57 | 5.45 | 6.19 |
| Mixing proportion of blowing agents (% by weight) *2 | Isobutane | 56.2 | 46.1 | 46.1 |
|  | Dimethyl ether | 26.8 | 36.5 | 36.5 |
|  | Carbon dioxide | 17.0 | 17.4 | 17.4 |
| Talc (% by weight) *1 |  | 2.2 | 2.2 | 2.2 |
| Passage shape of shaping device |  | Normal type | Type C | Type C |
| Distance between upper and lower plates (mm) |  | 28 *3 | 26 | 26 |
| Foaming temperature (° C.) |  | 125 | 125 | 124 |
| Extrusion rate (kg/hr) |  | 50 | 50 | 50 |
| Withdrawal rate (m/min) |  | 3.4 | 3.4 | 3.9 |

*1: % By weight based on the total amount of extruded foam plate.
*2: % By weight based on the total amount of blowing agents.
*3: Distance at the downstream end.

TABLE 2

Production Conditions

|  |  | Comp. Ex. 1 | Comp. Ex. 2 | Comp. Ex. 3 | Comp. Ex. 4 |
|---|---|---|---|---|---|
| Amount of blowing agents (% by weight) *1 | Isobutane | 3.13 | 0.63 | 4.73 | 1.23 |
|  | Dimethyl ether | 2.48 | 2.98 | 0.39 | 3.90 |
|  | Carbon dioxide | 0.00 | 1.43 | 0.70 | 0.00 |
|  | Total | 5.61 | 5.04 | 5.82 | 5.13 |
| Mixing proportion of blowing agents (% by weight) *2 | Isobutane | 55.8 | 12.5 | 81.3 | 24.0 |
|  | Dimethyl ether | 44.2 | 59.1 | 6.7 | 76.0 |
|  | Carbon dioxide | 0.0 | 28.4 | 12.0 | 0.0 |
| Talc (% by weight) *1 |  | 2.2 | 2.2 | 2.2 | 2.2 |
| Passage shape of shaping device |  | Normal type | Type C | Type C | Type C |
| Distance between upper and lower plates (mm) |  | 29 *3 | 26 | 26 | 26 |
| Foaming temperature (° C.) |  | 125 | 124 | 125 | 124 |
| Extrusion rate (kg/hr) |  | 50 | 50 | 50 | 50 |
| Withdrawal rate (m/min) |  | 3.4 | 3.4 | 3.4 | 3.4 |

*1: % By weight based on the total amount of extruded foam plate.
*2: % By weight based on the total amount of blowing agents.
*3: Distance at the downstream end.

TABLE 3-1

Test Results

|  | Ex.1 | Ex.2 | Ex.3 |
|---|---|---|---|
| Apparent density (kg/m³) | 39.5 | 39.7 | 40.2 |
| Thickness (mm) | 26 | 26 | 26 |
| Average cell diameter in thickness direction (mm) | 0.08 | 0.09 | 0.07 |

TABLE 3-1-continued

Test Results

|  |  | Ex.1 | Ex.2 | Ex.3 |
|---|---|---|---|---|
| Cell deformation rate (a/b and a/c) | | 0.95 | 0.96 | 0.99 |
| Closed cell content (%) | | 95 | 94 | 93 |
| Thermal conductivity (W/m · K) | *1 | 0.026 | 0.027 | 0.027 |
|  | *2 | 0.027 | 0.027 | 0.027 |
| Flammability | 5 Days after production | B | B | A |
|  | 2 Weeks after production | B | A | A |
| Residual amount of blowing agent (wt. %) *3 | Isobutane | 3.2 | 3.1 | 2.8 |
|  | Dimethyl ether | Not greater than 0.1 | Not greater than 0.1 | Not greater than 0.1 |
| Residual amount of isobutane (wt. %) *4 | | 3.2 | 3.0 | 2.8 |

*1: 4 Weeks after production
*2: 3 Months after production
*3: % By weight based on the weight of extruded foam plate measured 4 weeks after the production.
*4: % By weight based on the weight of extruded foam plate measured 3 months after the production.

TABLE 3-2

Test Results

|  |  | Ex. 4 | Ex. 5 | Ex. 6 |
|---|---|---|---|---|
| Apparent density (kg/m³) | | 39.5 | 39.5 | 33.7 |
| Thickness (mm) | | 28 | 26 | 26 |
| Average cell diameter in thickness direction (mm) | | 0.15 | 0.09 | 0.11 |
| Cell deformation rate (a/b and a/c) | | 1.33 | 0.97 | 0.95 |
| Closed cell content (%) | | 94 | 95 | 93 |
| Thermal conductivity (W/m · K) | *1 | 0.028 | 0.029 | 0.029 |
|  | *2 | 0.028 | 0.030 | 0.030 |
| Flammability | 5 Days after production | B | A | B |
|  | 2 Weeks after production | A | A | B |
| Residual amount of blowing agent (wt. %) *3 | Isobutane | 3.0 | 2.4 | 2.8 |
|  | Dimethyl ether | Not greater than 0.1 | Not greater than 0.1 | Not greater than 0.1 |
| Residual amount of isobutane (wt.%) *4 | | 3.0 | 2.4 | 2.7 |

*1: 4 Weeks after production
*2: 3 Months after production
*3: % By weight based on the weight of extruded foam plate measured 4 weeks after the production.
*4: % By weight based on the weight of extruded foam plate measured 3 months after the production.

TABLE 4

Test Results

|  |  | Comp. Ex. 1 | Comp. Ex. 2 | Comp. Ex. 3 | Comp. Ex. 4 |
|---|---|---|---|---|---|
| Apparent density (kg/m³) | | 39.8 | 39.9 | 40.1 | 39.4 |
| Thickness (mm) | | 29 | 26 | 26 | 26 |
| Average cell diameter in thickness direction (mm) | | 0.19 | 0.13 | 0.09 | 0.11 |
| Cell deformation rate (a/b and a/c) | | 1.49 | 0.97 | 1.01 | 0.98 |
| Closed cell content (%) | | 94 | 95 | 93 | 94 |
| Thermal conductivity (W/m · K) | *1 | 0.029 | 0.031 | 0.026 | 0.031 |
|  | *2 | 0.030 | 0.034 | 0.026 | 0.033 |
| Flammability | 5 Days after production | D | C | D | D |
|  | 2 Weeks after production | C | B | D | C |
| Residual amount of blowing agent (wt. %) *3 | Isobutane | 3.1 | 0.6 | 4.7 | 1.2 |
|  | Dimethyl ether | Not greater than 0.1 | Not greater than 0.1 | Not greater than 0.1 | Not greater than 0.1 |
| Residual amount of isobutane (wt. %) *4 | | 3.0 | 0.5 | 4.6 | 1.1 |

*1: 4 Weeks after production
*2: 3 Months after production
*3: % By weight based on the weight of extruded foam plate measured 4 weeks after the production.
*4: % By weight based on the weight of extruded foam plate measured 3 months after the production.

The apparent density, shown in Table 3-1, Table 3-2 and Table 4, is measured according to JIS K7222-1985.

The thickness of the extruded foam plate, shown in Table 3-1, Table 3-2 and Table 4, is the arithmetic mean of the thicknesses measured at three positions aligning in the lateral direction of the extruded foam plat and located such that the width of the extruded foam plate is divided into equal quarters.

The average cell diameter in the thickness direction and the cell deformation rate, shown in Table 3-1, Table 3-2 and Table 4, are measured according to the methods mentioned before.

The closed cell content, shown in Table 3-1, Table 3-2 and Table 4, is measured on a 25 mm×25 mm×20 mm cut sample cut off from the extruded foam plate and having no molded skin according to the method mentioned before.

The thermal conductivity, shown in Table 3-1, Table 3-2 and Table 4, is measured on two classes of sample pieces cut off from the extruded foam plate 4 weeks and three months, respectively, after the production. Each sample piece has a length of 20 cm, a width of 20 cm and a thickness of the extruded foam plate. The measurement is carried out by the plate type heat flow meter method (twin-plate type heat flow meter, average temperature: 20° C.) described in JIS A1412-1994 according to an instruction in Section 4.7 of JIS A9511-1995 using a thermal conductivity tester AUTO A Model HC-73 (manufactured by Eko Instruments Trading Co., Ltd.).

The flammability, shown in Table 3-1, Table 3-2 and Table 4, is measured according to Measuring Method A described in Section 4.13.1 of JIS A9511-1995. The measurement is conducted on 10 test pieces cut off from each of the extruded foam plates and evaluation is made according to the following criteria.

A: The fires on all the test pieces go out within 3 seconds and the average flaming time of the 10 test pieces is within 2 seconds.
B: The fires on all the test pieces go out within 3 seconds, and the average flaming time of the 10 test pieces is over 2 seconds but within 3 seconds.
C: The average flaming time of the ten test pieces is within 3 seconds but fires on one or more test pieces do not go out within 3 seconds.
D: The average flaming time of the ten test pieces is over 3 seconds.

The residual amount of blowing agents, shown in Table 3-1, Table 3-2 and Table 4, is measured according the method mentioned before, using cyclopentane as an internal standard substance, with Shimadzu Gas Chromatograph GC-14B manufactured by Shimadzu Corporation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method for the production of an extruded, polystyrene-based resin foam plate comprising the steps of heating and kneading a polystyrene-based resin together with a blowing agent, a flame retardant and 1.5 to 8% talc by weight based on the weight of said extruded foam plate, in an extruder to obtain a foamable molten composition, and extruding said foamable molten composition through a die attached to an end of said extruder into a lower pressure zone, wherein said blowing agent comprises:
   (a) not less than 25% by weight but not greater than 65% by weight, based on the total weight of said blowing agent, of an isobutane-containing saturated hydrocarbon;
   (b) not less than 5% by weight but not greater than 70% by weight, based on the total weight of said blowing agent, of a dimethyl ether-containing ether;
   (c) not less than 5% by weight but not greater than 55% by weight, based on the totai weight of said blowing agent, of carbon dioxide;
   (d) 0–25% by weight, based on the total weight of said blowing agent, of other blowing agent components;
   wherein said isobutane is at least 46.1% by weight of said blowing agent; and
   wherein said foam plate has a thermal conductivity of not greater than 0.030 W/m·K.

2. A method as claimed in claim 1, wherein said blowing agent comprises:
   at least 46.1% by weight but not greater than 60% by weight, based on the total weight of said blowing agent, of isobutane,
   less than 40% by weight but not smaller than 5% by weight, based on the total weight of said blowing agent, of dimethyl ether,
   greater than 10% by weight but smaller than 55% by weight, based on the total weight of said blowing agent, of carbon dioxide, and
   0–25% by weight, based on the total weight of said blowing agent, of other blowing agent components.

3. A method as claimed in claim 1, wherein said blowing agent comprises:
   not smaller than 55% by weight but not greater than 60% by weight, based on the total weight of said blowing agent, of isobutane,
   smaller than 35% by weight but not smaller than 15% by weight, based on the total weight of said blowing agent, of dimethyl ether,
   greater than 10% by weight but smaller than 30% by weight, based on the total weight of said blowing agent, of carbon dioxide, and
   0–10% by weight, based on the total weight of said blowing agent, of other blowing agent components.

4. A method as claimed in claim 1, wherein said flame retardant comprises at least one member selected from the group consisting of bromine-containing flame retardants and phosphorus-containing flame retardants.

5. A method as claimed in claim 1 wherein the amount of said dimethyl ether-containing ether is not less than 5% by weight but not greater than 29.7% by weight, based on the total weight of said blowing agent.

6. A method as claimed in claim 1 wherein said foam plate contains residual isobutane in the amount of 0.45–0.80 mol, per 1 kg of said foam plate.

7. A method as claimed in claim 1 wherein the amount of the residual isobutane is 0.45–0.56 mol, per 1 kg of said foam plate.

8. A method for the production of an extruded, polystyrene-based resin foam plate comprising the steps of heating and kneading a polystyrene-based resin together with a blowing agent, a flame retardant and a nucleating agent in an extruder to obtain a foamable molten composition, and extruding said foamable molten composition through a die attached to an end of said extruder into a lower pressure zone, wherein said blowing agent comprises:
   (a) not less than 25% by weight but not greater than 65% by weight, based on the total weight of said blowing agent, of an isobutane-containing saturated hydrocarbon;
   (b) not less than 5% by weight but not greater than 70% by weight, based on the total weight of said blowing agent, of a dimethyl ether-containing ether;
   (c) not less than 5% by weight but not greater than 55% by weight, based on the total weight of said blowing agent, of carbon dioxide;
   (d) 0–25% by weight, based on the total weight of said blowing agent, of other blowing agent components;
   wherein said isobutane is at least 46.1% by weight of said blowing agent; and
   wherein said foam plate has a thermal conductivity of not greater than 0.030 W/m·K and contains residual isobutane in an amount of 0.45–0.80 mol, per 1 kg of said foam plate.

9. A method as claimed in claim 8 wherein the amount of the residual isobutane is 0.45–0.56 mol, per 1 kg of said foam plate.

* * * * *

UNITED STATES PATENT AND TRADEMARK OFFICE
CERTIFICATE OF CORRECTION

PATENT NO. : 7,008,578 B2 Page 1 of 1
APPLICATION NO. : 10/170706
DATED : March 7, 2006
INVENTOR(S) : Naito et al.

It is certified that error appears in the above-identified patent and that said Letters Patent is hereby corrected as shown below:

Column 17, line 44 "totai" should read --total--

Column 18, line 28 "claim 1" should read --claim 6--

Signed and Sealed this

Twelfth Day of September, 2006

JON W. DUDAS
*Director of the United States Patent and Trademark Office*